US009729023B2

(12) United States Patent
Komori et al.

(10) Patent No.: US 9,729,023 B2
(45) Date of Patent: Aug. 8, 2017

(54) SMALL-SIZE ELECTRICAL APPLIANCE AND ELECTROMOTIVE UNIT OF THE SAME

(71) Applicant: Panasonic Intellectual Property Management Co., Ltd., Osaka-shi (JP)

(72) Inventors: Shunsuke Komori, Shiga (JP); Noboru Kobayashi, Osaka (JP); Hiroki Inoue, Shiga (JP); Toshio Ikuta, Shiga (JP); Yosiaki Yamanaka, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 14/944,195

(22) Filed: Nov. 17, 2015

(65) Prior Publication Data

US 2016/0156244 A1      Jun. 2, 2016

(30) Foreign Application Priority Data

Nov. 28, 2014   (JP) .................................. 2014-241806

(51) Int. Cl.
*H02K 5/10*          (2006.01)
*B26B 19/38*        (2006.01)
(Continued)

(52) U.S. Cl.
CPC .............. *H02K 5/10* (2013.01); *B26B 19/282* (2013.01); *B26B 19/3866* (2013.01);
(Continued)

(58) Field of Classification Search
CPC .............. B26B 19/282; B26B 19/3873; B26B 19/3866; F16J 15/52; H02K 7/14; H02K 33/00; H02K 5/10
(Continued)

(56) References Cited

U.S. PATENT DOCUMENTS 2,601,720 A      7/1952 Carissimi
4,024,770 A  *   5/1977 Liesenborghs .......... F16C 29/00
                                                     74/18.2
(Continued)

FOREIGN PATENT DOCUMENTS

DE          1553748         9/1970
EP           162277        11/1985
(Continued)

OTHER PUBLICATIONS

The Extended European Search Report dated Mar. 30, 2016 for the related European Patent Application No. 15193816.4.

*Primary Examiner* — Naishadh Desai
(74) *Attorney, Agent, or Firm* — McDermott Will & Emery LLP (57) ABSTRACT

An electromotive unit includes a linear motor, a motor case containing the linear motor, a movable element connected with the linear motor and reciprocatingly driven with respect to the motor case, and a sealing material sealing the gap between the movable element and the opening of the motor case. The sealing material includes a contact portion contacting the movable element; and a recessed portion formed around contact portion, having a ring-shaped groove facing the outside of the motor case, and elastically deformable according to reciprocating movement of the movable element. This aspect provides an electromotive unit that hardly generates noise while the movable element is being reciprocatingly driven; and a small-size electrical appliance including the electromotive unit.

5 Claims, 6 Drawing Sheets

(51) Int. Cl.
*B26B 19/28* (2006.01)
*H02K 7/14* (2006.01)
*H02K 33/00* (2006.01)
*F16J 15/52* (2006.01)

(52) U.S. Cl.
CPC ............ *B26B 19/3873* (2013.01); *F16J 15/52* (2013.01); *H02K 7/14* (2013.01); *H02K 33/00* (2013.01)

(58) Field of Classification Search
USPC .......................................................... 310/50
See application file for complete search history.

(56) References Cited

U.S. PATENT DOCUMENTS

| | | | | |
|---|---|---|---|---|
| 4,030,573 A | * | 6/1977 | Buzzi | B26B 19/04 188/380 |
| 4,426,776 A | * | 1/1984 | Kakumoto | B26B 19/105 30/34.1 |
| 4,505,036 A | * | 3/1985 | Ochiai | B26B 19/105 30/34.1 |
| 4,628,607 A | * | 12/1986 | Bertram | B26B 19/282 30/43.92 |
| 4,805,300 A | * | 2/1989 | Miska | B26B 19/04 30/34.1 |
| 5,064,034 A | * | 11/1991 | Rupprecht | F16D 65/22 188/343 |
| 5,466,084 A | | 11/1995 | Brueggen et al. | |

FOREIGN PATENT DOCUMENTS

| | | | | |
|---|---|---|---|---|
| EP | 164153 | | 12/1985 | |
| GB | 792197 A | * | 3/1958 | ............... F16J 15/52 |
| JP | 1-314587 | | 12/1989 | |
| JP | 01314587 A | * | 12/1989 | |
| JP | 2007-089709 A | | 4/2007 | |

\* cited by examiner

SMALL-SIZE ELECTRICAL APPLIANCE AND ELECTROMOTIVE UNIT OF THE SAME

RELATED APPLICATIONS

This application claims the benefit of Japanese Application No. 2014-241806, filed on Nov. 28, 2014, the disclosure of which Application is incorporated by reference herein.

TECHNICAL FIELD

The disclosure relates to a small-size electrical appliance and its electromotive unit.

BACKGROUND ART

Figure 9:
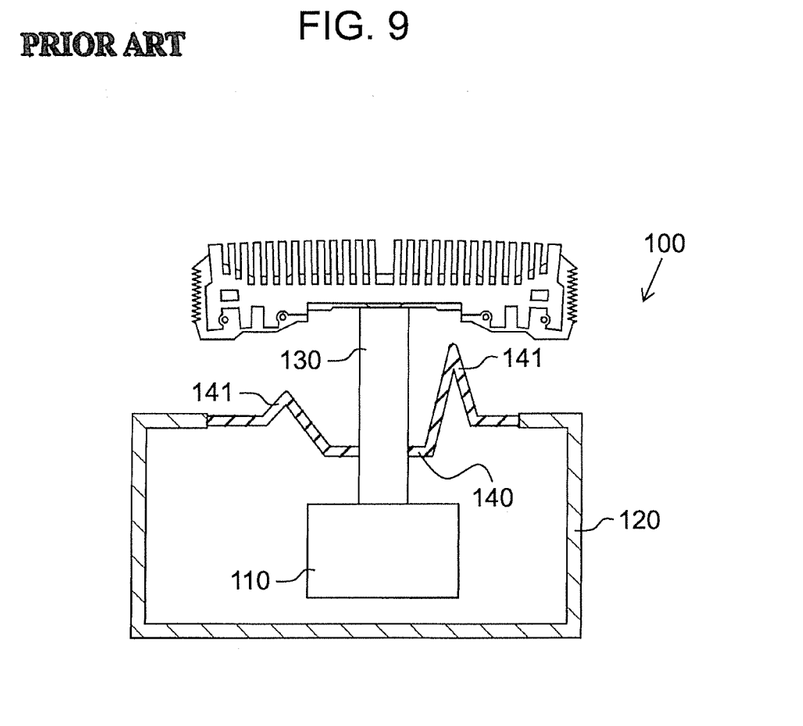
FIG. 9 is a schematic diagram of an existing electromotive unit.

FIG. 9 illustrates an example of an existing electromotive unit incorporated into an electric shaver disclosed in Japanese Patent Unexamined Publication No. 2007-89709.

Electromotive unit 100 includes linear motor 110, case 120 containing linear motor 110, movable element 130 joined to linear motor 110, and sealing material 140 made of rubber sealing the gap between movable element 130 and the opening of case 120.

Sealing material 140 is formed between movable element 130 and the opening of case 120, and has projection 141 projecting outside case 120. When movable element 130 is reciprocatingly driven with respect to case 120, projection 141 is elastically deformed. This causes movable element 130 to be reciprocatingly driven with respect to case 120 and the gap between movable element 130 and the opening of case 120 to be sealed.

SUMMARY OF THE INVENTION

Existing electromotive unit 100 described above may cause noise while movable element 130 is being reciprocatingly driven. To examine the cause, the inventor of the present application performed a test for comparing the loudness when electromotive unit 100 and an electromotive unit for comparison are driven under the same conditions. The comparative electromotive unit has a configuration substantially same as that of electromotive unit 100 except for the fact that the comparative sample does not have sealing material 140.

The above-described test has demonstrated that the comparative electromotive unit generates less noise than electromotive unit 100. This result suggests that sealing material 140 is greatly involved in noise generation. Hence, the inventor of the present application considers the cause of noise generated by electromotive unit 100 being driven as the following in relation to sealing material 140.

With electromotive unit 100, when projection 141 is deformed by movable element 130 being driven, air inside the inner space of projection 141 flows into the internal space of case 120 communicating with the inner space of projection 141 through the opening of projection 141.

Movable element 130 being reciprocatingly driven, airflow from the internal space of projection 141 toward the internal space of case 120 is repeatedly formed, which generates aerial vibration inside case 120. If the aerial vibration has a specific frequency substantially same as that of a component disposed on or in case 120, case 120 and other parts may resound to generate noise.

An electromotive unit incorporated into not only an electric shaver but other small-size electrical appliances can involve a problem similar to the above.

An object of the disclosure is to provide an electromotive unit that hardly generates noise when the movable element is reciprocatingly driven and a small-size electrical appliance including the electromotive unit.

An electromotive unit of a small-size electrical appliance according to one aspect of the disclosure includes a drive source, a case containing the drive source, a movable element joined to the drive source and reciprocatingly driven with respect to the case, and a sealing material sealing the gap between the movable element and the opening of the case. The sealing material is provided with a contact portion contacting the movable element and a recessed portion that has a groove formed around the contact portion and facing the outside of the case, and is elastically deformable according to reciprocating movement of the movable element.

A small-size electrical appliance according to one aspect of the disclosure is provided with the electromotive unit of the above-described small-size electrical appliance.

The small-size electrical appliance and its electromotive unit described above hardly generate noise while the movable element is being reciprocatingly driven.

DESCRIPTION OF EMBODIMENT (Examples of an Electromotive Unit and a Small-Size Electrical Appliance in a Possible Form)

[1] The electromotive unit of a small-size electrical appliance according to one aspect of the disclosure includes a drive source, a case containing the drive source, a movable element joined to the drive source and reciprocatingly driven with respect to the case, and a sealing material sealing the gap between the movable element and the opening of the case. The sealing material is provided with a contact portion contacting the movable element and a recessed portion that has a groove formed around the contact portion and facing the outside of the case, and is elastically deformable according to reciprocating movement of the movable element.

According to the aspect, when the recessed portion is elastically deformed by the movable element reciprocatingly driven, air inside the internal space of the recessed portion flows from the open part of the recessed portion to the outside of the recessed portion. The recessed portion is open to the outside of the case, and thus airflow from the internal space of the recessed portion toward the outside of the recessed portion is formed outside the case. Accordingly, even if aerial vibration is generated by elastic deformation of the recessed portion, strong vibration does not easily transmit to the case, which hardly generates noise resulting from resonance of the case.

[2] In one aspect of the electromotive unit of a small-size electrical appliance, the sealing material further includes an intermediate portion formed between the contact portion and the recessed portion.

According to the aspect, the gap between the contact portion and the recessed portion is expanded by the intermediate portion. Accordingly, the contact portion is resistant to contacting the recessed portion while the movable element is being reciprocatingly driven, which causes a minimum of loss resulting from the contact portion contacting the recessed portion.

[3] In the electromotive unit of a small-size electrical appliance according to one aspect of the disclosure, the intermediate portion includes a reinforcing portion disposed outside a path of the reciprocating movement of the movable element and reinforcing the contact portion, and an ordinary portion disposed on the path of the reciprocating movement of the movable element and configured to be more deformable than the reinforcing portion.

According to the aspect, the reinforcement of the intermediate portion by the reinforcing portion increases the durability of the intermediate portion. The ordinary portion formed on the intermediate portion provides resistance against the reciprocating movement of the movable element lower than the case where the reinforcing portion is formed on the entire intermediate portion.

[4] In the electromotive unit of a small-size electrical appliance according to one aspect of the disclosure, the ordinary portion is configured to have a width greater than that of the reinforcing portion. The aspect provides a larger gap between the contact portion and the recessed portion, thereby enhancing the advantage due to [2] described above.

[5] In the electromotive unit of a small-size electrical appliance according to one aspect of the disclosure, the reinforcing portion is configured to have a thickness greater than that of the ordinary portion. The aspect allows the reinforcing portion and the ordinary portion to be integrally formed due to the reinforcing function of the intermediate portion by the reinforcing portion.

[6] In the electromotive unit of a small-size electrical appliance according to one aspect of the disclosure, the sealing material includes a peripheral portion formed around the recessed portion. The recessed portion includes a bottom portion forming the bottom of the recessed portion, a first connecting portion that connects the contact portion with the bottom portion, and a second connecting portion that connects the peripheral portion with the bottom portion. The first connecting portion is configured to have a thickness decreasing from the contact portion toward the bottom portion.

The aspect prevents the boundary between the contact portion and the first connecting portion and its vicinity from undergoing a large stress while the movable element is being reciprocatingly driven.

[7] A small-size electrical appliance according to one aspect of the disclosure includes an electromotive unit described in any one of [1] through [6]. According to the aspect, the electromotive unit hardly generates noise while the movable element is being reciprocatingly driven, and thus a user is hardly subject to discomfort.

Exemplary Embodiment

Figure 1:
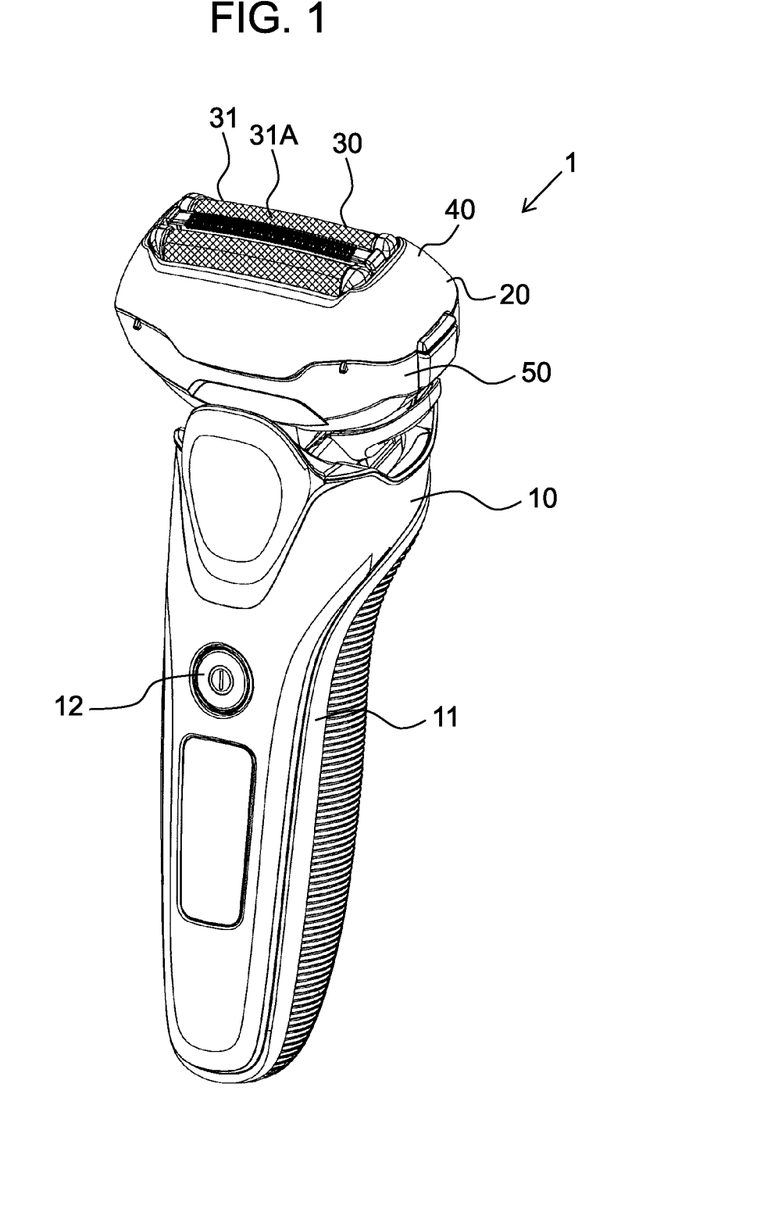
FIG. 1 is a perspective view of an electric shaver according to an exemplary embodiment.

A description is made of electric shaver 1 as an example of a small-size electrical appliance in reference to FIG. 1.

Electric shaver 1 includes body 10 and head 20 attached movably with respect to body 10.

Body 10 includes grip 11 grasped by a user and power switch 12 attached to grip 11. The inside of grip 11 contains a battery (not illustrated), from which power is supplied to linear motor 61 (refer to FIG. 4) of electromotive unit 60 contained in head 20 in response to on-operation of switch 12 by a user.

Figure 2:
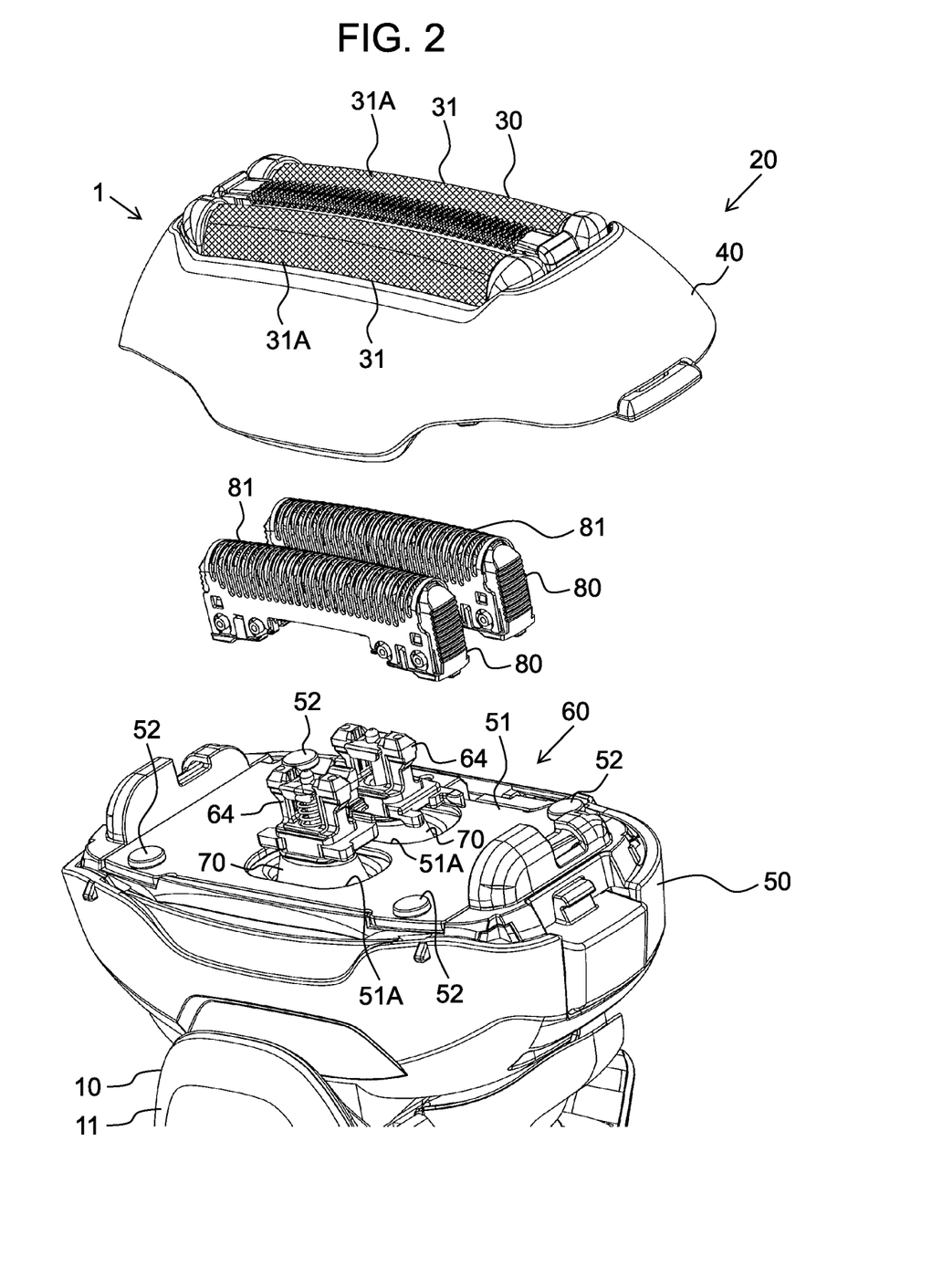
FIG. 2 is an exploded perspective view of the head of the electric shaver according to the embodiment.

A description is made of the configuration of head 20 in reference to FIG. 2.

Head 20 includes outer blade unit 30, head cover 40 with outer blade unit 30 attached thereto, head case 50 assembled to head cover 40, and a pair of inner blade units 80 disposed between head cover 40 and head case 50.

Beards, for example, of a user enter the inside of head 20 through multiple holes 31A formed in outer blade 31 of outer blade unit 30. The beards that have entered the inside of head 20 are inserted into between outer blade 31 and inner blade 81 of inner blade unit 80 and are cut off.

The inside of head case 50 is provided with electromotive unit 60 that reciprocatingly drives inner blade unit 80 in the longitudinal direction of head 20. The opening of head case 50 has keep plate 51 attached thereto that presses sealing material 70 of electromotive unit 60. Keep plate 51 is fixed to head case 50 with multiple screws 52. Hereinafter, the longitudinal direction of head 20, the direction in which inner blade unit 80 is reciprocatingly driven, is described as a longitudinal direction or a drive direction.

Figure 3:
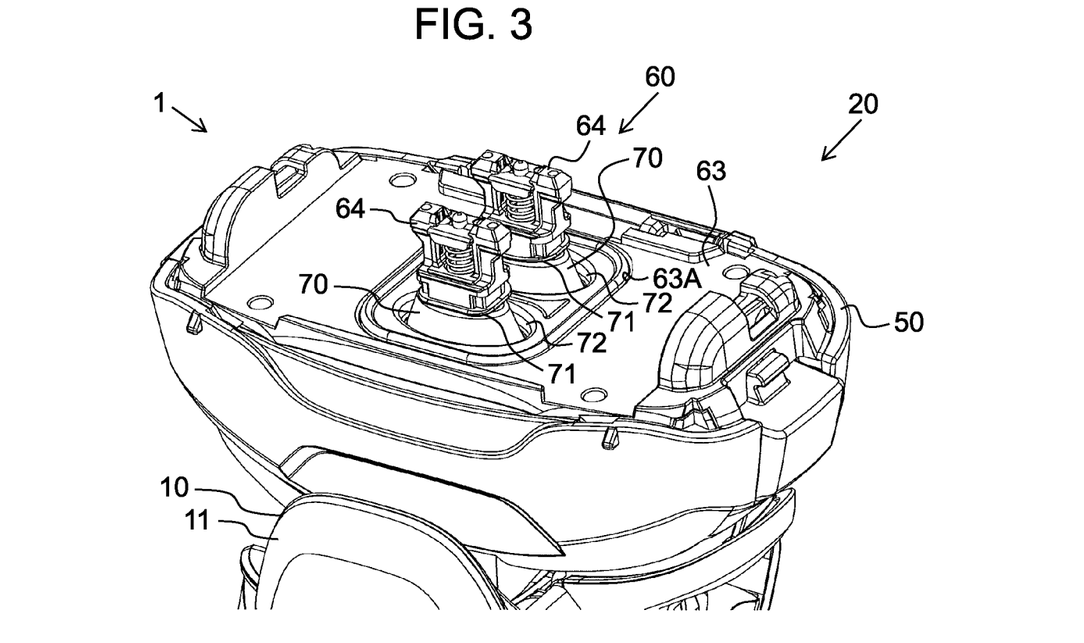
FIG. 3 is a perspective view of the head with the keep plate removed.
Figure 4:
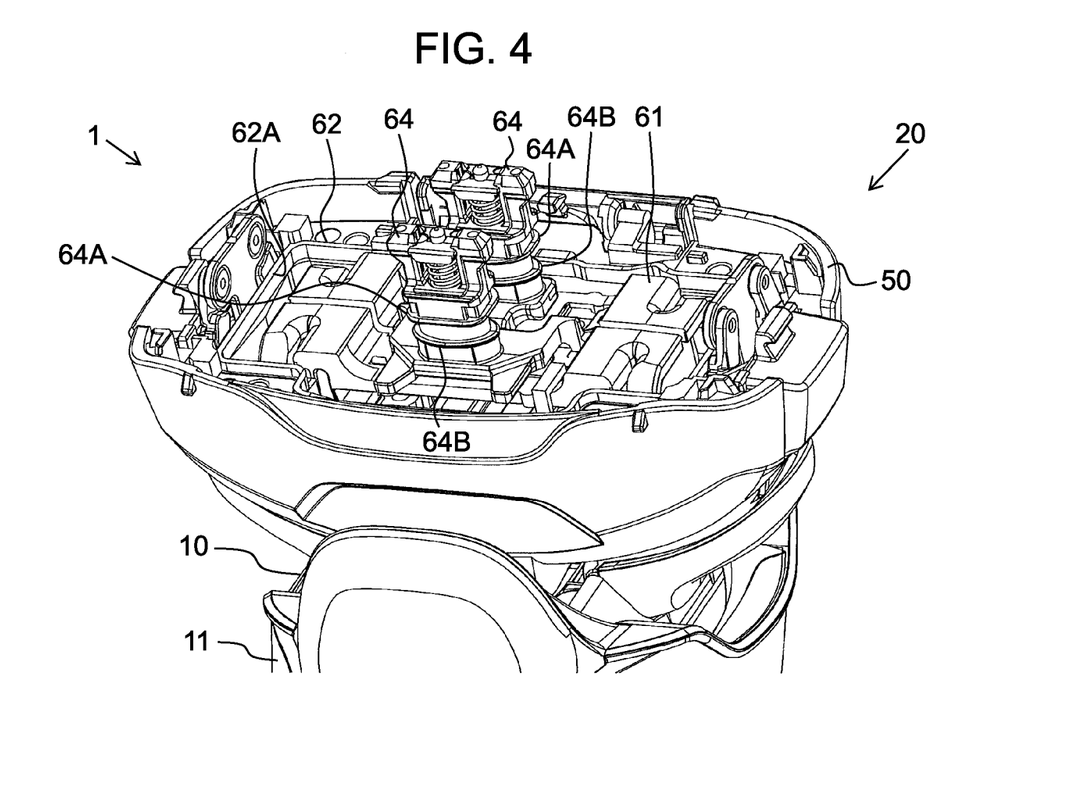
FIG. 4 is a perspective view of the head with the case cover removed.

A description is made of the configuration of electromotive unit 60 in reference to FIGS. 3 and 4.

Electromotive unit 60 includes linear motor 61 as a drive source, motor case 62 as a case for containing linear motor 61, a pair of movable elements 64 joined to linear motor 61, and sealing material 70 made of rubber (e.g., nitrile rubber) and disposed around movable element 64.

Linear motor 61 drives reciprocatingly the pair of movable elements 64 and inner blade units 80 (refer to FIG. 2) correspondingly connected to the pair of movable elements 64, in the longitudinal direction.

Motor case 62 has case cover 63 attached thereto for covering opening 62A of motor case 62. Hole 63A formed in the longitudinal center of case cover 63 has the pair of movable elements 64 and sealing material 70 inserted thereto.

The circumferential surface of movable element 64 has a pair of ribs 64A and 64B formed thereon that vertically positions sealing material 70 relative to movable element 64. Ribs 64A and 64B have sealing material 70 attached therebetween. As shown in FIG. 2, the two tips of the pair of movable elements 64 are correspondingly inserted into a pair of holes 51A formed in the longitudinal center of head 20, in keep plate 51.

Figure 5:
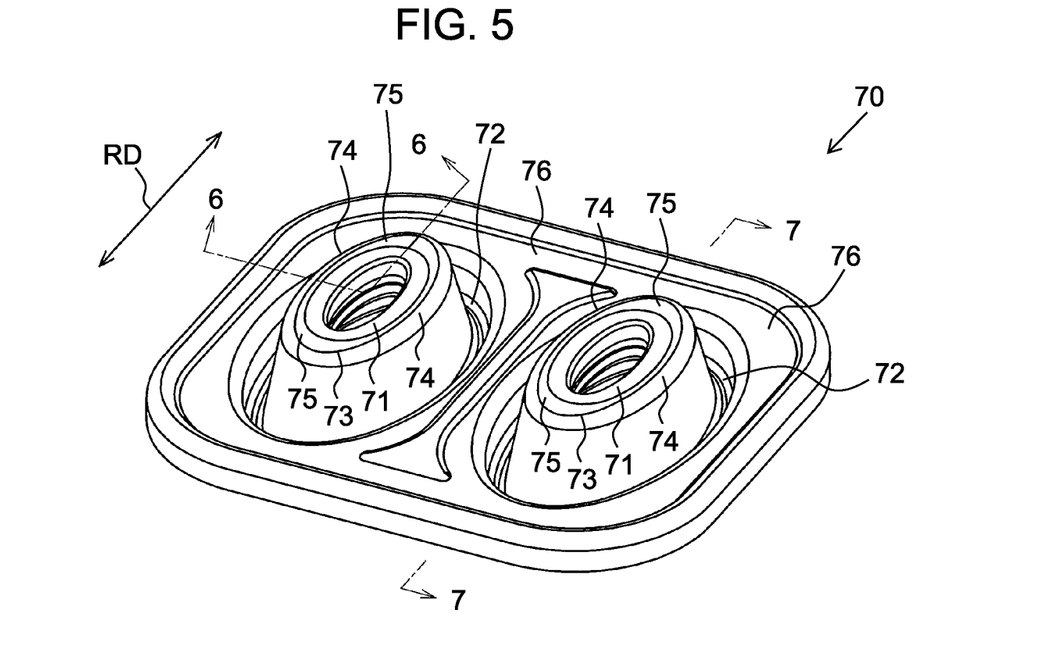
FIG. 5 is a perspective view of the sealing material.
Figure 6:
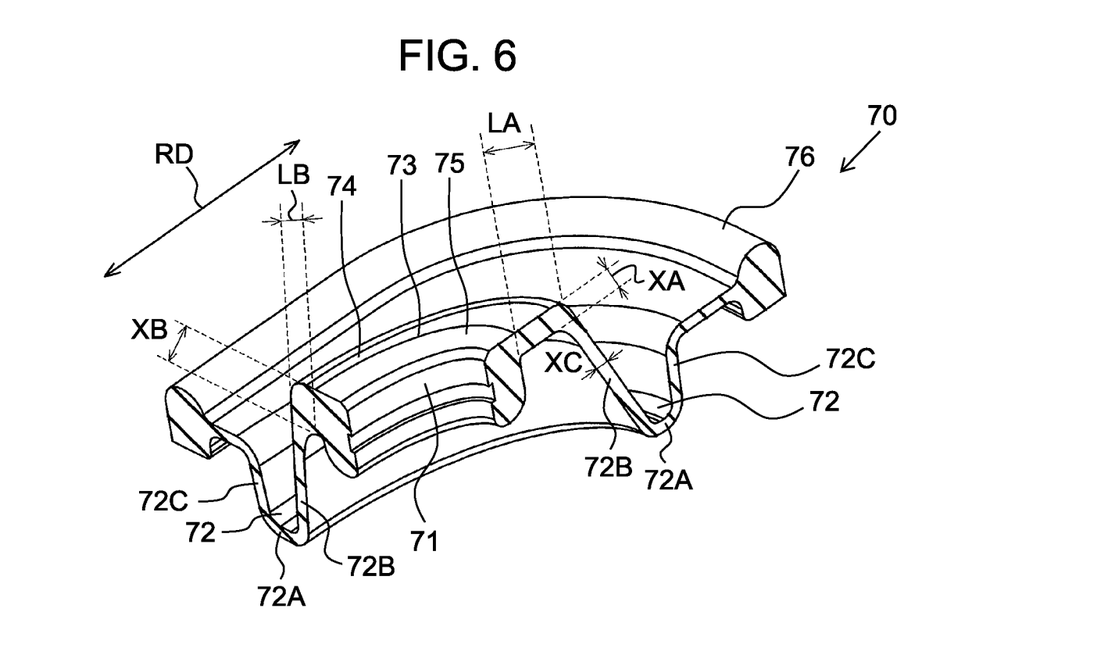
FIG. 6 a perspective half sectional view taken along line 6-6 of FIG. 5.

A description is made of the configuration of sealing material 70 in reference to FIGS. 5 and 6. Bidirectional arrows (RD) shown in FIGS. 5 through 8 indicate the drive direction of movable element 64 (refer to FIG. 3).

Sealing material 70 includes contact portion 71 that is hollow and cylindrical and is in contact with movable element 64 (refer to FIG. 3), recessed portion 72 formed around contact portion 71, intermediate portion 73 formed between contact portion 71 and recessed portion 72, and peripheral portion 76 formed around recessed portion 72. Contact portion 71, recessed portion 72, intermediate portion 73, and peripheral portion 76 are formed integrally.

Contact portion 71 is formed so as to surround the entire circumference of movable element 64 (refer to FIG. 3) and is in close contact with movable element 64 (refer to FIG. 3).

Intermediate portion 73 includes reinforcing portion 74 that reinforces contact portion 71 and ordinary portion 75 that is more easily deformed elastically than reinforcing portion 74. Reinforcing portion 74 is disposed outside the path of reciprocating movement of movable element 64 (refer to FIG. 3) of intermediate portion 73. Ordinary portion 75 is provided on the path of reciprocating movement of movable element 64 (refer to FIG. 3) of intermediate portion 73.

Recessed portion 72, formed around contact portion 71, has a ring-shaped groove facing the outside of motor case 62 (refer to FIG. 4). Recessed portion 72 has bottom portion 72A, first connecting portion 72B, and second connecting portion 72C. Bottom portion 72A forms the bottom of recessed portion 72. First connecting portion 72B connects contact portion 71 with bottom portion 72A. Second connecting portion 72C connects peripheral portion 76 with bottom portion 72A.

First connecting portion 72B connecting to reinforcing portion 74 extends perpendicularly downward from reinforcing portion 74 toward bottom portion 72A. First connecting portion 72B connecting to ordinary portion 75 extends obliquely downward from ordinary portion 75 toward bottom portion 72A.

After all, the two edges on the cross section (vertical to drive direction RD) of first connecting portion 72B are parallel viewed from drive direction RD. The two edges on the cross section (parallel with drive direction RD) of first connecting portion 72B are tapered viewed from the direction vertical to drive direction RD (refer to FIGS. 7 and 8).

Second connecting portion 72C as a whole extends obliquely upward from bottom portion 72A toward peripheral portion 76 to connect bottom portion 72A with peripheral portion 76. Bottom portion 72A is provided so as to connect the lower edge of first connecting portion 72B with the lower edge of second connecting portion 72C.

With such a configuration, recessed portion 72 is elastically deformed in the drive direction according to reciprocating movement of movable element 64 (refer to FIG. 4).

A description is made of the dimensions of sealing material 70 in reference to FIG. 6.

Length LA of ordinary portion 75 in drive direction RD is longer than length LB of reinforcing portion 74 in the direction orthogonal to drive direction RD. Thickness XB of sealing material 70 in the vertical direction is greater than thickness XA of ordinary portion 75 in the vertical direction.

Thickness XC of first connecting portion 72B connecting to ordinary portion 75 gradually decreases from ordinary portion 75 toward bottom portion 72A. That is, thickness XC at bottom portion 72A and its vicinity is smaller than thickness XC at ordinary portion 75 and its vicinity.

Figure 7:
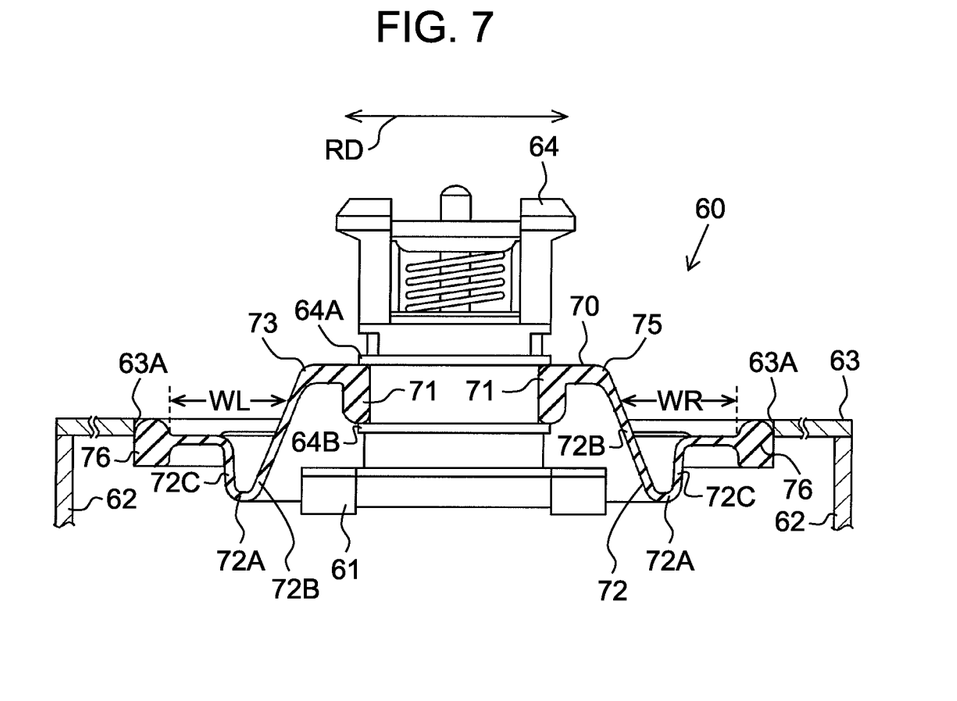
FIG. 7 is a sectional view of the electromotive unit taken along line 7-7 of FIG. 5.
Figure 8:
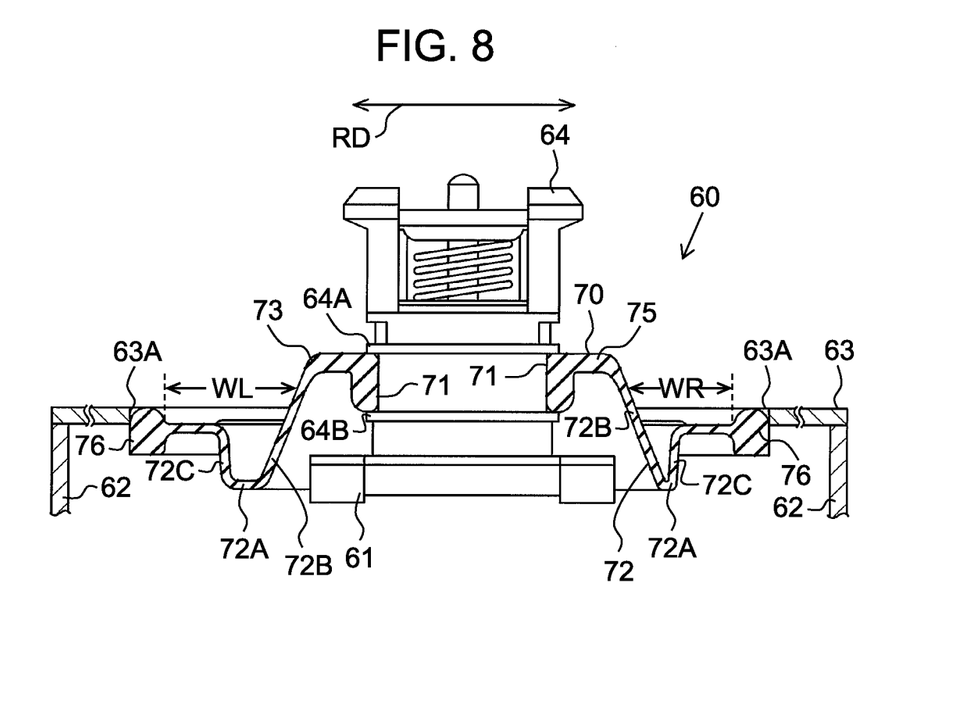
FIG. 8 is a sectional view of the electromotive unit with its movable element moved to the right.

A description is made of effects and advantages of electromotive unit 60 in reference to FIGS. 7 and 8. In FIGS. 7 and 8, inner blade unit 80 is omitted.

As shown in FIG. 7, when sealing material 70 is disposed between the pair of ribs 64A and 64B of movable element 64, peripheral portion 76 of sealing material 70 closely contacts hole 63A of case cover 63.

Resultingly, the gap between hole 63A of case cover 63 and movable element 64 is sealed to prevent moisture and foreign matter such as beards cut off from entering the inside of motor case 62. When power is supplied from the battery (not illustrated) to linear motor 61, movable element 64 is reciprocatingly driven in drive direction RD.

As shown in FIG. 8, when movable element 64 moves in either one of drive direction RD, contact portion 71 in contact with movable element 64 moves in that direction. Accordingly, ordinary portion 75 and first connecting portion 72B connecting to ordinary portion 75 move in that direction. Peripheral portion 76, in contact with hole 63A of case cover 63, does not move in drive direction RD.

As a result, when movable element 64 moves to the right in FIGS. 7 and 8 for example, distance WR between first connecting portion 72B on the right and peripheral portion 76 in FIG. 8 is shorter than that in FIG. 7. Distance WL between first connecting portion 72B on the left and peripheral portion 76 in FIG. 8 is longer than that in FIG. 7.

When recessed portion 72 is deformed according to such movement of movable element 64, air inside recessed portion 72 flows out from the open part of recessed portion 72 to the outside of recessed portion 72. Recessed portion 72 has a ring-shaped groove facing the outside of motor case 62, and thus this airflow is generated outside motor case 62.

Accordingly, even if aerial vibration occurs according to the deformation of recessed portion 72, strong vibration hardly transmits to motor case 62. Consequently, noise resulting from resonance of motor case 62 is hardly generated, and thus a user is hardly subject to discomfort.

Electromotive unit 60 further provides the advantages described below.

(1) According to this embodiment, the gap between contact portion 71 and recessed portion 72 is expanded by intermediate portion 73. Accordingly, contact portion 71 hardly contacts recessed portion 72 while movable element 64 is being reciprocatingly driven. This hardly causes loss resulting from contact portion 71 contacting recessed portion 72.

(2) According to this embodiment, reinforcement of intermediate portion 73 by reinforcing portion 74 increases the durability of intermediate portion 73. Ordinary portion 75 formed on intermediate portion 73 provides resistance against the reciprocating movement of movable element 64 lower than the case where reinforcing portion 74 is formed on entire intermediate portion 73.

(3) According to this embodiment, length LA of ordinary portion 75 in drive direction RD is longer than length LB of reinforcing portion 74 in the direction orthogonal to drive direction RD. This allows the gap between contact portion 71 and recessed portion 72 to be formed wider. Consequently, the advantage provided by electromotive unit 60 described in (1) is enhanced.

(4) According to this embodiment, thickness XB of reinforcing portion 74 in the vertical direction of sealing material 70 is set thicker than thickness XA of ordinary portion 75 in the vertical direction of sealing material 70. This allows reinforcing portion 74 and ordinary portion 75 to be integrally formed due to the reinforcing function of intermediate portion 73 by reinforcing portion 74.

(5) According to this embodiment, thickness XC of first connecting portion 72B connecting to ordinary portion 75 gradually decreases from ordinary portion 75 toward bottom portion 72A. This prevents the boundary between contact portion 71 and first connecting portion 72B and its vicinity from undergoing a large stress while movable element 64 is being reciprocatingly driven.

Modified Examples

The description related to the exemplary embodiment exemplifies a possible form of a small-size electrical appliance and its electromotive unit according to the disclosure and is not intended to limit the form. A small-size electrical appliance and its electromotive unit according to the disclosure can take a form of the following modified examples or a form produced from a combination of at least two modified examples compatible with each other.

In a modified example of sealing material 70, length LA of ordinary portion 75 is shorter than or equal to length LB of reinforcing portion 74.

In a modified example of sealing material 70, thickness XB of reinforcing portion 74 is smaller than or equal to thickness XA of ordinary portion 75.

In a modified example of sealing material 70, thickness XC of first connecting portion 72B gradually increases from ordinary portion 75 toward bottom portion 72A, or thickness XC of first connecting portion 72B is uniform over entire first connecting portion 72B.

In a modified example of sealing material 70, recessed portion 72 formed around reinforcing portion 74 can be omitted.

In a modified example of sealing material 70, at least one of ordinary portion 75 and reinforcing portion 74 can be omitted.

In electromotive unit 60 according to a modified example, motor case 62 and case cover 63 are integrally formed.

Electromotive unit 60 according to a modified example includes one or at least three movable elements 64.

Electromotive unit 60 according to a modified example includes a drive source different from linear motor 61. Such an example is a motor and a motion conversion mechanism. The motion conversion mechanism converts rotation of the motor to linear motion and transmits the motion to movable element 64.

Electromotive unit 60 according to a modified example is incorporated into a small-size electrical appliance different from an electric shaver. Such an example is an electric hair clipper or an electric tool.

As described above, the disclosure is applicable to an electromotive unit used for various types of small-size electrical appliances such as an electric shaver and an electric hair clipper.

The invention claimed is:

1. An electromotive unit of a small-size electrical appliance, comprising:
    a drive source;
    a case containing the drive source;
    a movable element connected to the drive source and reciprocatingly driven with respect to the case; and
    a sealing material sealing a gap between the movable element and an opening of the case,
    wherein the sealing material includes a contact portion contacting the movable element, and a recessed portion formed around the contact portion, the recessed portion having a groove facing an outside of the case, and elastically deformable according to reciprocating movement of the movable element,
    the sealing material further includes an intermediate portion formed between the contact portion and the recessed portion, and
    the intermediate portion includes a reinforcing portion disposed outside a path of the reciprocating movement of the movable element and reinforcing the contact portion, and an ordinary portion disposed on the path of the reciprocating movement of the movable element and configured to be more deformable than the reinforcing portion.

2. The electromotive unit of a small-size electrical appliance of claim 1, wherein a width of the ordinary portion is configured to be greater than a width of the reinforcing portion.

3. The electromotive unit of a small-size electrical appliance of claim 1, wherein a thickness of the reinforcing portion is configured to be greater than a thickness of the ordinary portion.

4. The electromotive unit of a small-size electrical appliance of claim 1,
    wherein the sealing material includes a peripheral portion formed around the recessed portion,
    wherein the recessed portion includes a bottom portion forming a bottom of the recessed portion, a first connecting portion connecting the contact portion with the bottom portion, and a second connecting portion connecting the peripheral portion with the bottom portion, and
    wherein a thickness of the first connecting portion decreases from the contact portion toward the bottom portion.

5. A small-size electrical appliance including the electromotive unit of claim 1.

* * * * *